E. SEGESVÁRY.
DEVICE FOR AUTOMATICALLY REGULATING HEATING MEDIUMS BY AN EXPANSIBLE FLUID IN A THERMOSTAT.
APPLICATION FILED SEPT. 28, 1908.
950,306. Patented Feb. 22, 1910.
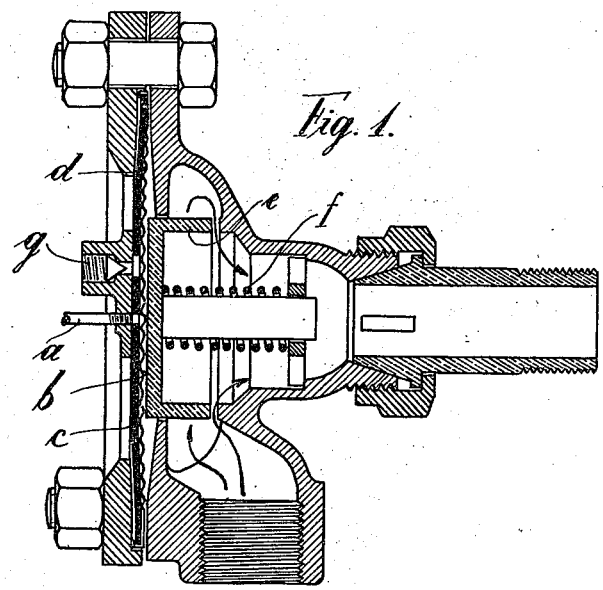
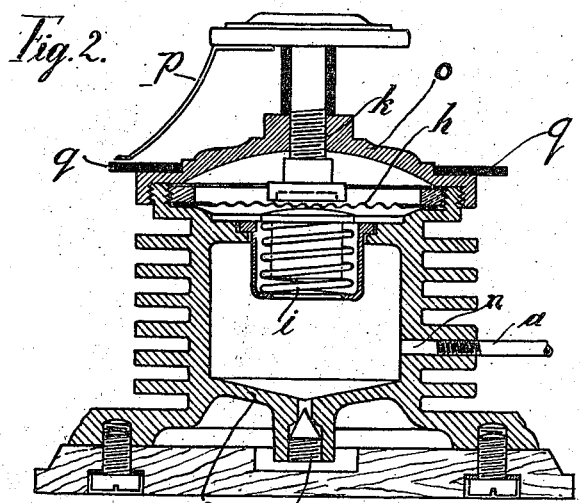

UNITED STATES PATENT OFFICE.

ERNST SEGESVÁRY, OF BREMEN, GERMANY.

DEVICE FOR AUTOMATICALLY REGULATING HEATING MEDIUMS BY AN EXPANSIBLE FLUID IN A THERMOSTAT.

950,306.

Specification of Letters Patent.   Patented Feb. 22, 1910.

Application filed September 28, 1908. Serial No. 455,170.

*To all whom it may concern:*

Be it known that I, ERNST SEGESVÁRY, a citizen of Hungary, residing at Bremen, in the free town of Bremen, Germany, have invented certain new and useful Improvements in Devices for Automatically Regulating Heating Mediums by an Expansible Fluid in a Thermostat, of which the following is a specification, reference being had therein to the accompanying drawing.

This invention relates to a device for regulating automatically the passage of heating medium through a valve, and the essential feature of the invention is embodied in the use of a thermostat containing a readily-volatilizing fluid for regulating the supply of the volatile liquid to the valve for the purpose to be hereinafter more fully described.

Prior to this invention, thermostats containing a readily-volatilizing fluid have been employed to govern the admission of heating medium through a valve, but the volatile liquid was sealed in a vessel having a flexible side contacting the valve and permanently exposed to the heating medium.

This invention obviates the permanent exposure of a sealed vessel containing the volatile-liquid to the heating medium, and subjects the volatile liquid to the influence of the heating medium in the valve only at intervals of a predetermined temperature of the atmosphere in the vicinity of the thermostat.

In the drawings forming part of this specification, in which like letters of reference denote like parts wherever they occur, Figure 1 is a sectional view of the improved valve device; and Fig. 2 is a sectional view of the thermostat.

The improved valve device shown in Fig. 1 is formed of a suitable casing having a valve chamber containing a valve *e* normally held off its seat by a spring *f*, said valve casing having a diaphragm chamber, divided by a diaphragm *b* into a chamber opening into said valve chamber, into which said valve protrudes, and a closed or pressure chamber *d* between said diaphragm and the rigid plate *c*. The stopper *g* when removed allows the regulator to be charged with a volatile liquid, for example, ether.

The form of thermostat used in connection with the valve device is constructed with the casing *l* having a stopper *m* for charging the closed chamber with ether located adjacent to the diaphragm *h*.

The pipe *a* screwed into opening *n* connects the closed chamber containing the ether of the thermostat with the said closed chamber of the valve device. A protecting cover *o* is provided, having a graduated scale *q* mounted thereon. A set-hand *p* fastened to the head of the set-screw *k*, can be set at any desired degree of temperature on the said scale. The spring *i*, holds the diaphragm *h* in engagement with the end of said set-screw.

This invention is not limited to the precise structural details, the purpose being to procure means for automatically introducing a volatile liquid into a closed chamber of a valve device to regulate same.

The operation of the device is as follows: The thermostat, located in a dwelling-room, and connected to the valve device is charged with ether through either plug *g* or *m*, depending upon their relative positions, and the set-hand of the thermostat set at a desired degree of temperature. If the temperature of the room rises above the desired degree, the expansion of the ether in the thermostat due to such increase of temperature causes a drop or drops of ether to enter the closed chamber *d* of the valve device through the pipe *a*. The ether, being a readily-vaporizing liquid and having a boiling point less than the heating medium, immediately vaporizes in contacting the diaphragm *b*, which is heated by the heating medium, and on account of the large increase in volume which occurs on a liquid being converted into vapor, the increase in the volume in the closed chamber causes the diaphragm *b* to bulge outwardly, pressing the valve against its seat, cutting off the supply of heating medium. If the temperature of the room falls below the desired degree, the ether contracts and draws the fluid in the pipe back, creating a vacuum therein, which draws the vaporizing ether from the closed chamber *d* into said pipe, and allows the spring *f* to unseat the valve. As said pipe is not heated, the vaporizing ether condenses when drawn into said pipe from the closed chamber *d*.

In the case of instruments for which ether is not suitable for a thermostat liquid, another liquid must be employed for the same. The evaporating liquid is then separated by means of a special diaphragm from the thermostat liquid which transmits the expansion, due to temperature, to the evaporating liquid.

Having thus described my said invention what I claim and desire to secure by Letters-Patent is:

A thermostat, comprising in combination with a valve and a valve-casing located in a fluid heating system, said valve being normally open, a diaphragm bearing with one side on said valve, and forming a chamber at its opposite side, a second chamber in distant communication with said first chamber and adapted to contain a volatile fluid and means for manually adjusting the volume of fluid in said second chamber whereby the flow of fluid from said second chamber is varied in response to different temperatures and is volatilized in said first chamber by direct contact of the heating medium with said diaphragm, said volume adjusting means comprising a diaphragm separating one end of said second chamber, a spring pressed plunger carried by said casing within said chamber and bearing against one side of said diaphragm, and a set-screw bearing on the opposite side of said diaphragm and opposing the pressure of said spring pressed plunger.

In testimony whereof I affix my signature in presence of two witnesses.

ERNST SEGESVÁRY.

Witnesses:
HANS WOLFF,
OTTO HOFMANN.